Jan. 11, 1949. E. J. ZULINSKI ET AL 2,458,758
APPARATUS FOR RESISTANCE WELDING
Filed Nov. 6, 1944 3 Sheets-Sheet 1

INVENTORS.
Edward J. Zulinski,
Robert Barley,
BY Harness, Dickey & Pierce.
ATTORNEYS.

Jan. 11, 1949.  E. J. ZULINSKI ET AL  2,458,758
APPARATUS FOR RESISTANCE WELDING
Filed Nov. 6, 1944  3 Sheets-Sheet 2
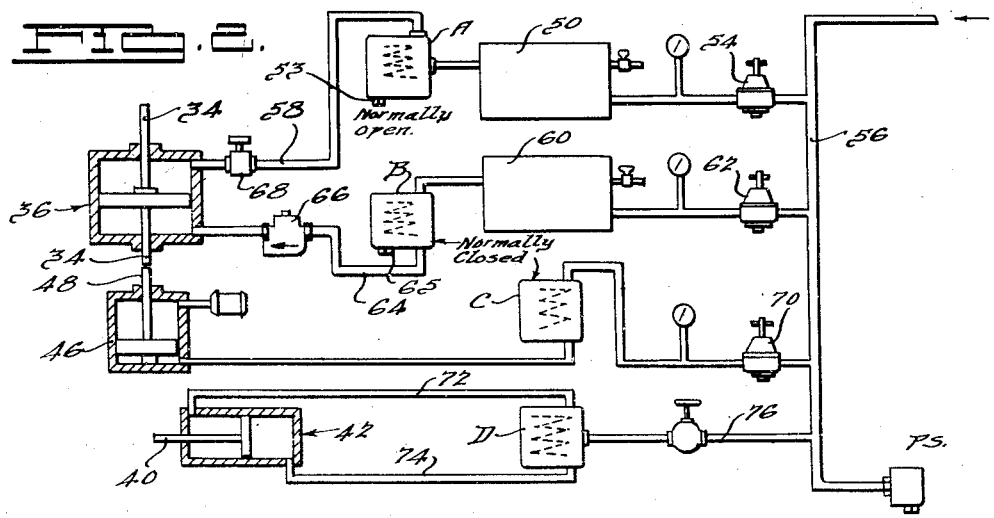
FIG. 2.
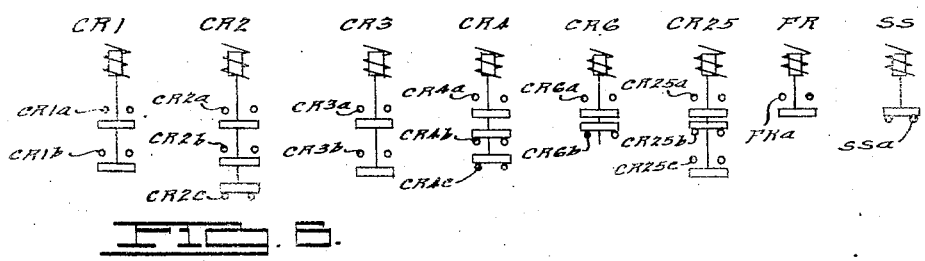
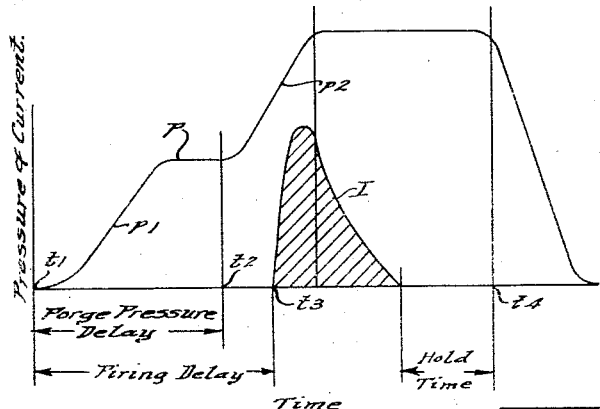
FIG. 3.
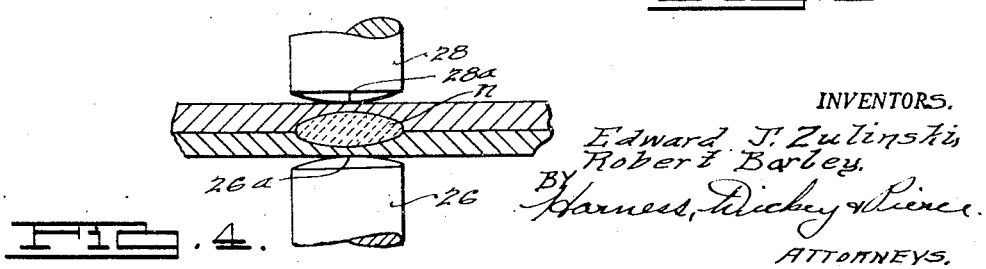
FIG. 4.
INVENTORS.
Edward J. Zulinski,
Robert Barbey.
BY Harness, Dickey & Pierce
ATTORNEYS.

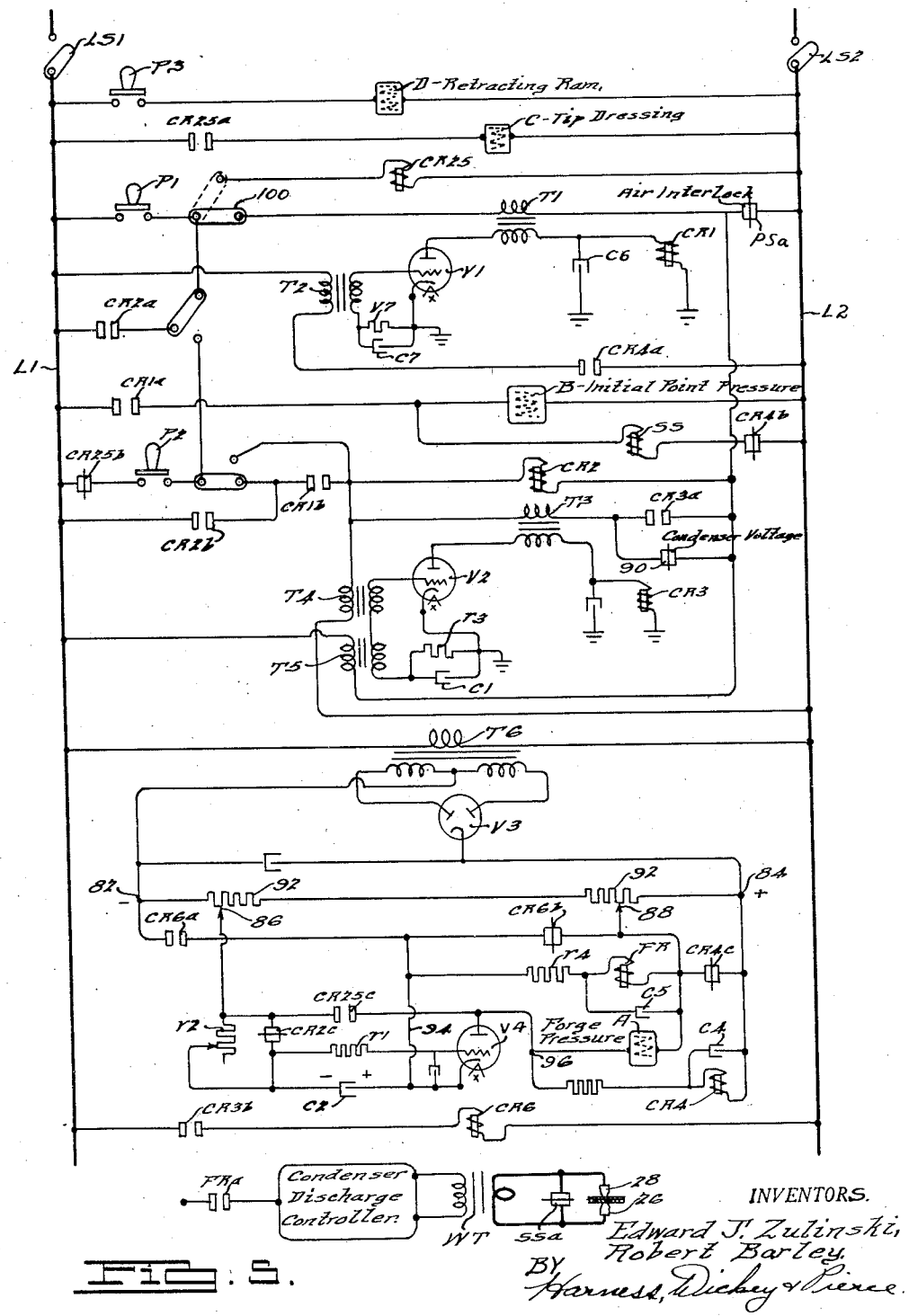

Patented Jan. 11, 1949

2,458,758

UNITED STATES PATENT OFFICE 2,458,758

APPARATUS FOR RESISTANCE WELDING

Edward J. Zulinski and Robert Barley, Detroit, Mich., assignors to Progressive Welder Company, Detroit, Mich., a corporation of Michigan Application November 6, 1944, Serial No. 562,106

4 Claims. (Cl. 219—4)

The present invention relates to apparatus for resistance welding and provides an improved apparatus which is particularly suited to the resistance spot welding of aluminum and the alloys thereof present utilized, for example, in aircraft production.

The principal objects of the present invention are to provide apparatus, as generically characterized above, which is simple in arrangement, economical of manufacture and operation and which is reliable and efficient in operation; to provide such an arrangement characterized in that the work to be welded is initially subjected to a predetermined pressure, which pressure is thereafter caused to increase at a controlled rate to a predetermined higher value, and in that a controlled quantity of welding current is passed through the work while pressure is applied thereto; to provide such an arrangement characterized in that the flow of welding current is initiated after the increase in pressure is initiated; and the higher pressure is attained before the current flow is completed or, at least, before the resulting weld nugget "sets" sufficiently to permit the formation of cracks or other defects; and to generally improve and simplify apparatus for effecting the welding of various classes of metals.

With the above as well as other objects in view, which appear in the following description and in the appended claims, a preferred but illustrative embodiment is described hereinafter and is illustrated in the accompanying drawings, throughout the several views of which corresponding reference characters are used to designate corresponding parts and in which:

Fig. 2 is a diagrammatic view of fluid control circuits embodying the invention;

Fig. 3 is a graph illustrative of pressure and current relations involved in making a weld in accordance with the invention;

Fig. 4 is a fragmentary view illustrating the engaged relation between the work and the electrodes;

Fig. 5 is a diagrammatic showing of a control system which may be used in the practice of the invention; and Fig. 6 is a view showing the mechanical relation between certain coils and contacts, which are shown separated from each other in Fig. 5.

Figure 1:
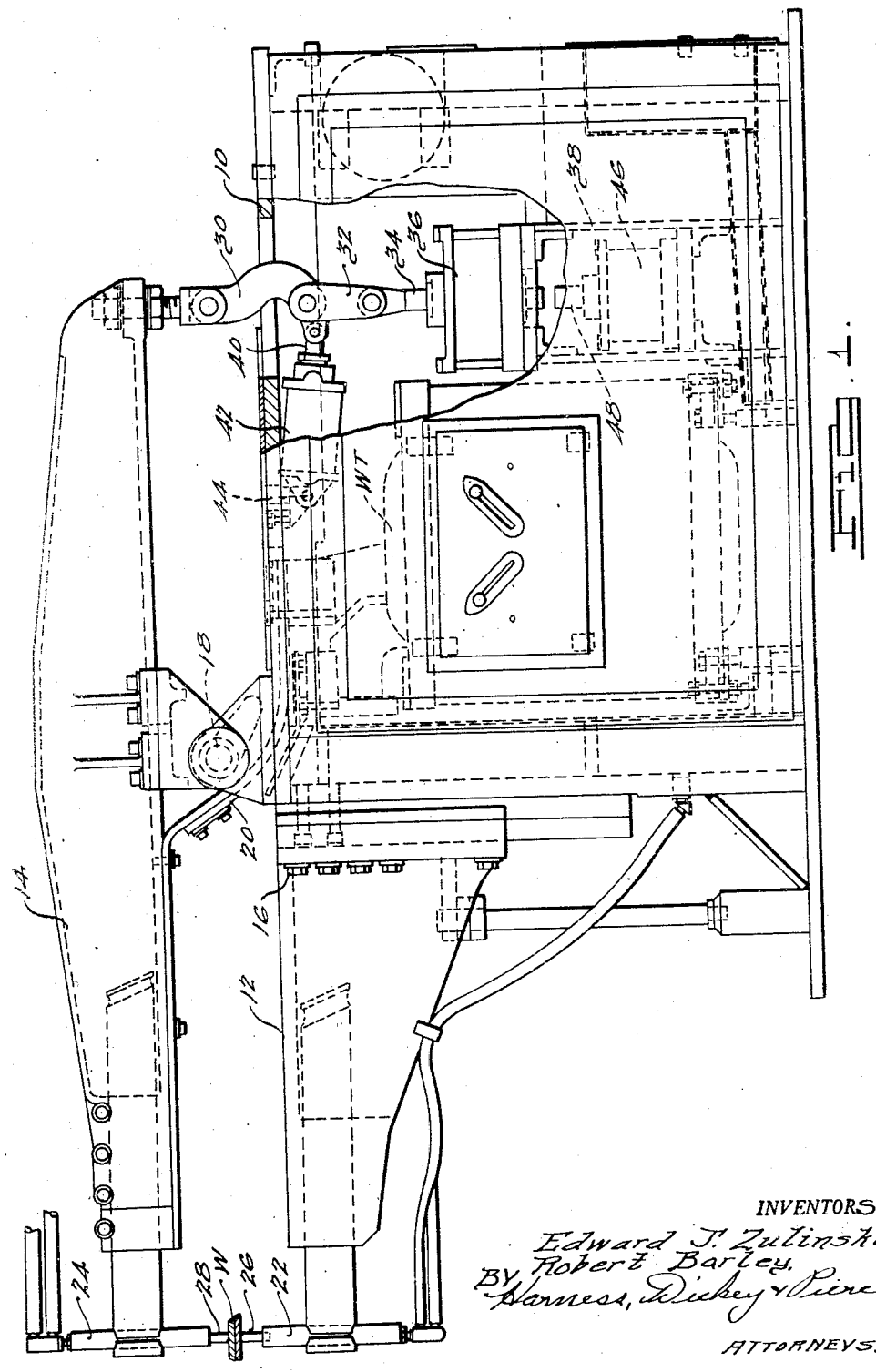
Figure 1 is a view in side elevation of an illustrative machine which may be used to practice the invention.

It will be appreciated from a complete understanding of the present invention that the improvements thereof may be embodied in various different systems, particularly designed to effect the welding of various different classes of materials. The welding cycle specifically disclosed herein has been found to be particularly advantageous in connection with the welding of the various aluminum alloys such for example as that known commercially by the trade designation 24ST. Preferred uses of the invention are in connection with the welding of such alloys.

Referring first to Fig. 1, an illustrative machine, which has been found satisfactory for the practice of the invention, comprises an enclosing frame structure 10, which supports a lower horn 12 and an upper horn 14. The lower horn 12, which is formed of conductive material, is directly but adjustably secured to the frame 10 by means of studs 16, and, as will be understood, is permanently connected to one terminal of the secondary winding of the usual welding transformer WT, which is suitably supported within the frame 10. The upper horn 14, also formed of conductive material, is pivotally supported upon the frame 10 by means of a shaft 18, and is permanently connected to the other secondary terminal of the transformer WT by means of a flexible bus 20, it being understood that horns 12 and 14 are, where necessary and in accordance with usual practice, insulated from each other except through the transformer connection.

The horns 12 and 14 adjustably carry electrode holders 22 and 24, which, in turn, support electrodes 26 and 28, which may be and preferably are of the conventional domed construction shown in greater detail in Fig. 4.

The horn 14 is coupled through an adjustable linkage, comprising links 30 and 32, to the piston rod 34 of a main ram 36. Ram 36 is suitably supported within the machine frame 10 by means of structural elements, such as 38. The link 30 is pivotally connected to the piston rod 40 of a double acting retracting ram 42, the cylinder whereof is pivotally connected by means of a shaft 44 to the machine frame. Compressed air or other operating fluid is normally supplied to the ram 42 in such relation as to cause it to maintain the links 30 and 32 in a straightened condition. Under these conditions, ram 36 normally maintains the electrodes 26 and 28 separated by an amount sufficient to enable adjustment of the work relative to the electrodes. Upon being actuated, as hereinafter described, ram 36 rocks the horn 14 counterclockwise and brings the electrodes into engagement with the work, which condition is illustrated in full lines in Fig. 1.

With ram 36 in its normal condition, ram 42 may be actuated to withdraw its piston 40 into the cylinder, which action rocks the horn 14 counterclockwise to a retracted position, affording an unusually wide separation between the electrodes 26 and 28.

The illustrated machine also comprises a dressing ram 46, stationarily supported within the machine frame below the main ram 36. The piston rod 34 of ram 36 projects downwardly through the base thereof, as well as upwardly through the cap thereof, and in the normal position of ram 36, the lower end of piston rod 34 engages the upper end of the piston rod 48, associated with ram 46. As described below, ram 46 may be actuated to act through piston rod 34 and bring the electrodes into engagement with each other at a relatively low pressure, suitable for point dressing operations.

In the broader aspects of the invention, various fluid control circuits may be utilized to control the mechanical operations of the machine, through the action of the just-mentioned rams 36, 42 and 46. In the system diagrammatically shown in Fig. 2, the space above the piston of ram 36 is normally connected to a reservoir 50, containing an elastic fluid, such as air, at a controlled pressure, through an electromagnetically operated valve A, which may be of usual construction. So long as the solenoid associated with valve A is de-energized, this valve completes the just-mentioned connection between ram 36 and reservoir 50, and isolates its exhaust connection 53. It will be understood that if the solenoid of valve A is energized, line 58 is disconnected from the reservoir 50 and is connected to exhaust through connection 53. Reservoir 50 is supplied, through a regulating valve 54, from a header 56, which may be connected to any suitable source of air. With this arrangement, it will be noticed that ram 36 is normally effective to maintain the electrodes 26 and 28 in a separated position in which they are adapted to receive the work between them.

The space beneath the piston of ram 34 is arranged for connection, through a solenoid operated valve B, to a reservoir 60, containing air at a pressure in excess of the pressure in reservoir 50. Reservoir 60 is supplied from the header 56 through a regulating valve 62. It will be understood that valve B may be of a usual three-way type, arranged, when the solenoid thereof is de-energized, to isolate line 64 from reservoir 60 and connect the same to the exhaust port 65. When, however, and so long as, the solenoid of valve B is energized, this valve interrupts the exhaust connection and connects line 64 to reservoir 60. If desired, a rate controlling valve 66 may be interposed in line 64. As described below, valve B is energized at the beginning of a welding operation and thereupon becomes effective to develop a pressure against the underside of the piston of ram 36, which is superior to the pressure supplied from reservoir 50. In response to this superior pressure, the piston of ram 36 moves upwardly and brings the electrodes into engagement with a pressure determined by the difference between the pressures in reservoirs 50 and 60. In accordance with the present invention, this initial electrode pressure is sufficient to cause the points 28 and 26 to solidly seat against the work, preparatory to the initiation of the flow of welding current. As is also described below and prior to the initiation of the flow of welding current, valve A is energized, thereby exhausting the pressure initially applied against the upper surface of the piston of ram 36. This exhaust takes place at a rate determined by a flow controlling valve 68 interposed in line 58. The rate of this exhaust action controls the rate at which the pressure rises from the initial value to the final value, and the final value is, of course, determined by the pressure in reservoir 60.

The dressing ram 46 is normally connected to exhaust through an electromagnetically-operated, normally closed, three-way valve C. By energizing valve C, this exhaust connection may be interrupted and ram 46 may be connected to the header 56 through a regulating valve 70. Valve 70 affords only a relatively low value of pressure, suitable for point dressing operations, and, as described below, when it is desired to effect such an operation, valve A is energized simultaneously with the energization of valve C, so as to relieve the counterpressure normally applied to ram 36 from reservoir 50.

The double acting retracting ram 42 is connected through lines 72 and 74 to a usual electromagnetically-operated, four-way valve D, the inlet connection whereof is connected to the header 56 through line 76. Valve D normally connects line 76 to line 74 and, consequently, applies a pressure behind the piston of ram 42, thereby normally holding this ram in the extended position shown in Fig. 1. In order to retract the points to their position of widest separation, valve D is energized, which action disconnects line 74 from line 76, connects line 74 to exhaust, and connects line 72 to line 76.

The valves A, B, C and D are shown in outline form only in Fig. 2, it being understood that these valves may embody any of a variety of conventional constructions. For example, the three-way valves B and C may be constructed as described in connection with any of valves 108, 110 and 112 in the copending application of Hugo Purat, Serial No. 466,981, filed November 26, 1942, now patent No. 2,413,783, dated January 7, 1947. Valves A and D may be constructed, as described in connection with valve 106 in the just-mentioned copending application, it being noted that in connection with valve A, the outlet 182 of said valve 106 would be plugged.

From the foregoing general description, it will be appreciated that in the normal condition of the machine ram 42 is energized in such relation as to maintain the toggle links 30 and 32 in a straightened condition; reservoir 50 is effective through valve A to supply fluid to the upper part of ram 36, thereby maintaining the electrodes 26 and 28 in a separated condition, and the under side of the piston of ram 36 is connected to exhaust. In making a weld in accordance with the present method, the work W is inserted in usual fashion between the electrodes 26 and 28 and valve B is energized, which action connects reservoir 60 to the under side of the piston of ram 36. Pursuant to this action, a pressure is built up against said under side which exceeds the counterpressure from reservoir 50 by an amount sufficient to bring the electrodes into engagement with the work at the preliminary welding pressure. The rate at which this pressure builds up is controlled by the valve 66 and, in general, it is preferred to adjust this valve to provide substantially a free flow therethrough. Consequently, said preliminary pressure is established virtually immediately, and causes the electrodes 26 and 28 to clamp the work with the preliminary pressure. The buildup of this pressure is illustrated by the curve P, Fig. 3, in which figure ordinates represent pressure and current and abscissae represent time. In Fig. 3, valve B may be considered as being energized at time $t1$, in response to which action the pressure builds up along the portion $p1$ of curve P and ultimately attains the uniform value represented by the portion of the curve between portions $p1$ and $p2$. This uniform pressure is referred to herein as the preliminary pressure. This preliminary value may be and preferably is of a value somewhat lower than the pressure value conventionally considered suitable in welding cycles which employ only a single pressure stage. This value, also, is such as to establish a value of contact resistance between the engaged faces of the work pieces that sufficient heat to make the weld can be generated without requiring an undue expenditure of electrical energy.

As will be understood, the preliminary pressure causes the domed faces $26a$ and $28a$ of the electrodes (Fig. 4) to bear against the work. In the absence of any resultant deformation of the work and electrode surfaces, only a point contact would be provided between each electrode and the work. The electrode faces are, however, struck on relatively wide arcs and sufficient depression of the work results to distribute the contact over a finite area which may be, for example, 3 to 5% of the area of the face of each electrode. The flow of current through the work enables the electrode pressure to form minute surface depressions therein which materially increase the area of engagement, bringing such area to a value, for example, of between 10 and 20% of the electrode face area.

At the expiration of a controlled period of time, sufficient to allow the just-mentioned setting, valve A is energized, thereby isolating reservoir 50 and connecting the upper part of ram 36 to exhaust through valve 68 and line 58. In response to this action, the counterpressure is dissipated at a rate determined by the setting of valve 68. This dissipation of pressure correspondingly increases the pressure of the electrodes against the work. In accordance with the invention, the pressure in reservoir 60 is so set as to cause the ultimate high pressure, per unit area of final engagement of the electrodes, to be sufficiently high to prevent the formation of cracks or other defects in the weld nugget. Such final unit pressure may, depending on the character of the work, and, in the broader aspects of the invention, be either higher than, equal to, or lower than the initial unit pressure.

During the course of the just-mentioned rise in pressure along the portion $p2$ of curve P, the welding transformer WT is energized and is caused to deliver to the work a pulse of current sufficient to form the weld nugget $n$ in Fig. 4. Various types of apparatus may be utilized to produce this pulse of current, condenser discharge or storage battery apparatus being preferred. It will be understood that apparatus of this sort may be arranged to cause the delivery of the just-mentioned pulse in a very short interval of time, the pulse being represented by the shaded portion under the curve I in Fig. 3. It is preferred that the aforesaid final electrode pressure be attained during the flow of welding current, and, more particularly, that it be attained shortly after the current peak is attained.

As aforesaid, the flow of current through the work softens the same, enabling the applied electrode pressure to force the electrodes closer together and depress the surface of the work. This increase in contact area is a very important advantage which results from initiating the increase in applied pressure not later than, and preferably prior to, the initiation of current flow in that the inertia of the electrodes and other structure which moves therewith is thereby more surely overcome by the time the work softens. The work depression thus promptly follows the work-softening, and the formation of blowholes is effectively prevented.

Preferably, the control for valve A and for the welding transformer are so related as to permit adjustment of the time $t2$ at which valve A is energized relative to the time $t3$, at which the flow of welding current is initiated. With this relation, time $t3$ may be located either before or a desired interval after the time $t2$ or may be synchronized with the time $t2$. In the preferred practice of the invention, as aforesaid, it is preferred to locate time $t3$ relative to time $t2$ in approximately the relation shown in Fig. 3. This positioning is advantageous in that it delays the initiation of current flow until after any turbulence or unsteadiness created by the initial energization of valve A has been dissipated and the rate of rise in electrode pressure has attained a stable condition.

At the conclusion of the weld and in accordance with conventional practice, valves A and B are de-energized, which relieves the electrode pressure and applies pressure to ram 36 in such direction as to cause the electrodes to be separated from the work.

It will be appreciated from the foregoing that, depending upon the characteristics of the materials being welded, both as to composition and gauge, the character and dimensions of the electrodes, and other recognized variables encountered in practice, the current and pressure cycle of which Fig. 3 is illustrative, may vary between relatively wide limits. By way of illustration but not of limitation, illustrative operating conditions are specified below.

I. Material to be welded: two pieces 24ST, .040 gauge.
II. Electrodes: material: hard drawn copper
   Electrode diameter ⅝" dia.; dome radius 3"; initial contact area .0117 sq. in.; final contact area .0415 sq. in.
III. Welding Controller: condenser discharge, 960 microfarads at 1900 volts; discharge time 20 to 30 milli-seconds.
IV. Pressures:
   Electrode counterpressure, in reservoir 50, 25#/ sq. in.
   Electrode pressure, reservoirs, 60-50, 25#/sq. in.
   Electrode pressure, reservoir 60, 50#/sq. in.
   Initial unit pressure, 80,300#/sq. in.
   Final unit pressure, 45,300#/sq. in.
V. Timing: (see Fig. 3)
   From $t1$ to $t2$—140 to 150 milli-seconds
   From $t2$ to $t3$—20 to 25 milli-seconds
   From $t3$ to $t5$—50 to 60 milli-seconds As will be understood, various different control systems may be utilized to afford the above-described sequence, the system shown in Fig. 3 being illustrative only. Referring to this figure, valves A, B, C and D are diagrammatically illustrated in connection with associated control elements comprising electronic valves V1, V2, V3 and V4. Valves V1 and V2 may be and preferably are of the high vacuum, continuous control type. Valves V3 and V4 may be and preferably are of the gas-filled type, valve V3 being a full wave rectifier and valve V4 being a usual control valve of the discontinuous type. The system also includes a series of control relays CR1, CR2, CR3, CR4, CR6 and CR25 and a contactor SS, the mechanical relation between the coils and contacts whereof is shown in Fig. 6. It will be appreciated that these contacts occupy the illustrated positions so long as the associated coils are de-energized, but move to and remain in the opposite position when and so long as the coils are energized. The contactor SS serves the purpose of a short circuiting switch and its sole contact SSa is connected directly across the secondary of the welding transformer WT, it being understood that this switch serves to dissipate any residual energy in the welding transformer prior to separation of the electrodes so as to prevent sparking at the latter. The previously mentioned condenser discharge controller is diagrammatically represented by the panel 80. It will be understood that this controller may be of any of a variety of commercially available types. It will further be understood that while the indicated contact FRa is open, the controller automatically receives charging current from an associated source (not shown), whereby it is charged to a predetermined voltage, in readiness for the weld. In making a weld, the contact FRa is closed, in response to which action the controller 80 delivers the previously mentioned pulse of current to the welding transformer WT, successive surges being preferably delivered in alternately opposite directions. Reopening of the contact FRa enables the controller to recharge itself in readiness for the next weld.

It is believed that the remaining details of the system may best be understood by a description of the operation thereof. The system may be conditioned for operation by closing the disconnect switches LS1 and LS2, thereby energizing the line conductors L1 and L2 from a conventional source of alternating current of, for example, a frequency of 60 cycles. In response to this action, transformer T5, associated with valve V2, is energized and is thereby rendered effective to apply a negative bias to the grid of valve V2 and charge up a timing condenser c1. These actions serve only to render valve V2 non-conductive, as will be understood. Energization of line conductors L1 and L2 also energizes transformer T6, the center-tapped secondary winding whereof applies, through valve V3, a rectified potential between terminals 82 and 84. This action charges timing condenser c2 to the indicated polarity through a charging circuit which extends from the potentiometer tap 86, through the now closed back contact CR2c of relay CR2, condenser c2, now closed back contact CR6b of relay CR6 and tap 88. The negative terminal of condenser c2 is coupled through resistor r1 to the grid of valve V4, and the positive terminal of condenser c2 is coupled to the cathode of this valve. When charged, as aforesaid, accordingly, condenser c2 negatively biases valve V4 and renders it non-conductive.

Assuming it is desired to make a weld, the first stage P1 of the starting switch may be closed, which action completes an obvious energizing circuit for the primary winding of transformer T1, associated with valve V1. This energizing circuit is subject to the normally closed contact PSa of an air interlock switch PS (Fig. 2), which switch is closed so long as the pressure in the air supply header 56 is at or above its normal value. Upon being energized, transformer T1 applies a potential across valve V1, which is now in a conductive condition and, consequently, passes current to energize control relay CR1. Upon being so energized, relay CR1 closes its contacts CR1a and CR1b. Closure of contact CR1a completes an obvious energizing circuit for valve B and for the coil of the short circuiting switch SS. The latter action opens the short circuiting contact SSa, associated with the welding transformer WT, and the former action, as above described, brings the electrodes into engagement with the work and establishes the preliminary welding pressure.

Closure of contact CR1b is preparatory to the operations which result from the closure of the second stage P2 of the starting switch. More particularly, closure of switch P2 completes an obvious circuit, through the now closed contact CR1b for the coil of control relay CR2 and for the primary windings of transformers T3 and T4, associated with the anode and grid circuits of valve V2.

Upon being energized, relay CR2 closes its contacts CR2a and CR2b and opens its contact CR2c. The former contacts complete holding circuits in parallel with the starting switches P1 and P2, which may thereupon be released to the open positions without effect upon the welding cycle now being initiated. The opening of contact CR2c serves only the purpose of introducing a resistor r2 into the circuit of condenser c2, it being understood that the initially closed condition of this contact affords a low resistance charging circuit for condenser c2.

The energization of transformer T4 enables it to oppose the reversely connected transformer T5, thereby enabling the energy stored in the timing condenser c1 to start discharging through the local circuit including resistor r3. At the expiration of a predetermined discharge period, proportioned to be long enough to insure the proper engagement of the work by the electrodes, and the establishment of the initial electrode pressure, valve V2 becomes conductive, enabling the now energized transformer T3 to pass current therethrough and energize control relay CR3. It will be noticed that the energizing circuit for transformer T3 includes a voltage interlock contact 90, which is closed so long as the condensers associated with the condenser discharge controller 80 are at a sufficiently high potential. Upon being energized, relay CR3 closes its contacts CR3a and CR3b. Contact CR3a serves only the purpose of completing a maintaining circuit for transformer T3, through which this transformer is energized after the interlock 90 opens, pursuant to the discharging of the main power condensers.

Closure of contact CR3b completes an energizing circuit for the coil of relay CR6, which thereupon reverses the position of its contacts CR6a and CR6b. This action initiates the increase in electrode pressure and also, in predeterminedly timed relation thereto, initiates the flow of welding current.

More particularly, the opening of contact CR6b disconnects the positive terminal of condenser c2 from potentiometer tap 88, and closure of contact CR6a connects such terminal to the negative terminal 82 of the direct current source. In response to this action, condenser c2 is enabled to discharge through the local circuit, including a portion of resistor r2, tap 86, the left-hand portion of potentiometer resistor 92, and the now closed contact CR6a, to the positive terminal condenser c2. At the expiration of a period determined by the characteristics of this discharge circuit, the grid of valve V4 becomes neutral with respect to the cathode thereof, thereby rendering this valve conductive. In the usual case in which it is desired to initiate the increase in electrode pressure prior to the initiation of the flow of welding current, resistor r2 is adjusted to render this discharge almost instantaneous. It will be noticed that under normal conditions, the anode and cathode of valve V4 are neutral with respect to each other, both being connected to potentiometer tap 88. The energization of relay CR6, however, directly connects the cathode of valve V4 to the negative terminal 82 through contacts CR6a and conductor 94. The opening of contact CR6b disconnects the cathode from tap 88. Upon being thus rendered conductive and supplied with anode potential, valve V4 completes an energizing circuit for air valve A. The circuit for valve A extends from the negative terminal 82, through contact CR6a and valve V4 to terminal 96. From terminal 96 the circuit extends through valve A and the now closed back contact CR4c to the positive terminal 84. This action applies the full potential of the direct current source to valve A and promptly energizes it, initiating the aforesaid increase in electrode pressure.

The initial closure of contact CR6a also completes an energizing circuit for the coil of the firing relay FR, which circuit includes resistor r4 and the initially closed contact CR4c. A condenser c5 is connected in parallel with the coil of relay FR and delays the actuation of this relay for a desired period. This period, as aforesaid, is preferably in excess of the time required to allow for the energization of valve A.

Upon being actuated, the firing relay FR closes its sole contact FRa and thereby, as aforesaid, actuates the condenser discharge controller 80. This action causes the delivery of the pulse of welding current to the welding transformer WT and to the work.

When valve V4 becomes conductive, as described above, it also completes a circuit for the coil of relay CR4, which circuit duplicates the circuit traced for valve A as far as terminal 96. From terminal 96, the circuit extends through the coil of relay CR4 to the positive supply terminal 84. A timing condenser c4 is connected in parallel with the coil of relay CR4 and delays the actuation of this relay for a period sufficiently long to allow for the full discharge of the condenser discharge controller 80. At the expiration of this timing period, relay CR4 assumes the energized position, closing its contact CR4a and opening its contacts CR4b and CR4c. The opening of the latter contact serves only to reduce the voltage applied to the coils of the firing relay FR and valve A.

The opening of contact CR4b de-energizes the short circuiting switch SS, which thereupon recloses its sole contact SSa. This action completes a short circuit for the secondary winding of the welding transformer WT, preparatory to the separation of the electrodes 26 and 28.

The closure of contact CR4a energizes grid transformer T2, associated with value V1, thereby enabling this transformer to negatively bias valve V1 and render the latter non-conductive. This action interrupts the supply of energizing current for relay CR1 and enables the energy stored in the coil thereof to start discharging through the local circuit, including control condenser C6.

At the expiration of a predetermined hold-time, sufficient to insure the final setting of the weld, relay CR1 resumes the de-energized position, opening its contacts CR1a and CR1b. The opening of contact CR1a de-energizes the air valve B, thereby relieving the welding pressure from the electrodes 26 and 28, preparatory to the separation of these electrodes. The opening of contact CR1b de-energizes relay CR2 and transformers T3 and T4. Upon being de-energized, relay CR2 opens its contacts CR2a and CR2b, which actions serve only to interrupt the previously traced holding circuits in parallel with the starting switches P1 and P2. In addition, relay CR2 recloses its contact CR2c, preparatory to the recharging of timing condenser c2.

The de-energization of transformer T3 de-energizes control relay CR3 and the de-energization of transformer T4 re-establishes the blocking bias on the grid of valve V2.

Upon being de-energized, relay CR3 reopens its contacts CR3a and CR3b. The opening of the contact CR3a again renders transformer T3 subject to control by the voltage interlock 90, and the opening of contact CR3b de-energizes relay CR6. It is believed to be clear that the de-energization of relay CR6 restores the associated circuits to the original condition, in which condenser c2 is charged, valve V4 is blocked, and air valve A and relays FR and CR4 are de-energized. The de-energization of relay FR causes its contact FRa to reopen, thereby enabling the recharging of the condenser discharge controller 80, preparatory to the next weld. The de-energization of valve A again connects reservoir 50 (Fig. 2) to ram 36, causing the latter to separate the electrodes. The de-energization of relay CR4 causes its contacts CR4a, CR4b and CR4c to resume the illustrated positions. The actions of contacts CR4b and CR4c are preparatory only, but the opening of contact CR4a de-energizes transformer T2, enabling the energy stored in the associated condenser c1 to start discharging through the local circuit including resistor r1. At the expiration of this discharge period, valve V1 again becomes conductive, preparatory to the next welding operation. It will be noticed that relay CR1 cannot be re-energized until valve V1 again becomes conductive and condenser c1, therefore, affords an off-time, which must intervene between successive welds.

The above operations complete the resetting of the system in preparation for the next weld.

As will be obvious, if it is desired to widely separate the electrodes, the control switch P3 may be closed, which action energizes valve D, associated with the retracting ram which functions as aforesaid.

Also, if it is desired to effect a tip dressing operation, throw-over switch 100 may be thrown to its opposite position, enabling closure of switch P1 to energize relay CR25. Upon being energized, relay CR25 closes contacts CR25a and CR25c and opens contact CR25b. The opening of the latter contact serves to render the start switch P2 ineffective. Closure of contact CR25a and CR25c completes circuits, respectively, for the tip dressing valve C and valve A. Upon being energized, valve A relieves the counterpressure, an aforesaid, and valve C actuates the dressing ram 46.

Although only a single specific embodiment of the invention has been described in detail, it will be appreciated that various modifications may be made in the invention without departing from the spirit and scope thereof.

What is claimed is:

1. In a resistance-welding system embodying an electrode engageable with work to be welded and electrode control mechanism operative to apply pressure between the electrode and the work, the combination of a first control means actuable to actuate said control mechanism and apply a substantially constant initial said pressure, a first and second independently operable time delay means, said first time delay means being operative upon actuation thereof to initiate at the expiration of a predetermined time interval an increase in said pressure, said second time delay means being operative upon actuation thereof to initiate at the expiration of a predetermined time interval an impulse of welding current to flow through the work and the electrode, said first and second time delay means being operably independent of each other for independently controlling said initiation of pressure and of said current respectively.

2. In a resistance-welding system embodying an electrode engageable with work to be welded and electrode control mechanism operative to apply pressure between the electrode and the work, the combination of a first control means actuable to actuate said control mechanism and apply a substantially constant initial said pressure, a first and second independently operable time delay means, and control means for initiating concurrently the operation of said first and said second time delay means, said first time delay means being operative to initiate at the expiration of a predetermined time interval an increase in said pressure, said second time delay means being operative to initiate at the expiration of a predetermined time interval an impulse of welding current to flow through the work and the electrode, said first and second time delay means being operably independent of each other for independently controlling said initiation of pressure and of said current respectively.

3. In a resistance-welding system embodying an electrode engageable with work to be welded and electrode control mechanism operative to apply pressure between the electrode and the work, the combination of a first control means actuable to actuate said control mechanism and apply a substantially constant initial said pressure, a first and second independently operable time delay means, a second control means for initiating concurrently the operation of said first and said second time delay means, said first time delay means being operative to initiate at the expiration of a predetermined time interval an increase in said pressure, said second time delay means being operative to initiate at the expiration of a predetermined time interval an impulse of welding current to flow through the work and the electrode, said first and second time delay means being operably independent of each other for independently controlling said initiation of pressure and of said current respectively, and means for adjustably controlling said predetermined time of one of said time delay means, said adjustment being sufficiently great whereby said adjustable predetermined time may be in a range from less than to greater than the other of said predetermined times.

4. In a resistance-welding system embodying an electrode engageable with work to be welded and electrode control mechanism operative to apply pressure between the electrode and the work, the combination of a first control means actuable to actuate said control mechanism and apply a substantially constant initial said pressure, a first and second independently operable time delay means, and a second selectively operable control means rendered operable solely subsequent to the actuation of said first control means for initiating concurrently the operation of said first and said second time delay means, said first time delay means being operative to initiate at the expiration of a predetermined time interval an increase in said pressure, said second time delay means being operative to initiate at the expiration of a predetermined time interval an impulse of welding current to flow through the work and the electrode, said first and second time delay means being operably independent of each other for independently controlling said initiation of pressure and of said current respectively.

EDWARD J. ZULINSKI.
ROBERT BARLEY.

REFERENCES CITED

The following references are of record in the file of this patent:

UNITED STATES PATENTS

| Number | Name | Date |
| --- | --- | --- |
| 1,618,764 | Lunn | Feb. 22, 1927 |
| 1,902,955 | Holmes | Mar. 28, 1933 |
| 2,323,038 | Stone et al. | Feb. 18, 1941 |
| 2,270,767 | Platz | Jan. 20, 1942 |
| 2,305,042 | Thacker | Dec. 15, 1942 |
| 2,363,753 | Smith et al. | Nov. 28, 1944 |